United States Patent
Strashny et al.

(10) Patent No.: US 12,486,904 B2
(45) Date of Patent: Dec. 2, 2025

(54) HYDRAULIC VALVE

(71) Applicant: Caterpillar Global Mining LLC, Tucson, AZ (US)

(72) Inventors: Igor Strashny, Tucson, AZ (US); Andrew Hamilla, Tucson, AZ (US)

(73) Assignee: Caterpillar Global Mining LLC, Tucson, AZ (US)

( * ) Notice: Subject to any disclaimer, the term of this patent is extended or adjusted under 35 U.S.C. 154(b) by 17 days.

(21) Appl. No.: 18/285,252

(22) PCT Filed: Apr. 20, 2022

(86) PCT No.: PCT/US2022/025485
§ 371 (c)(1),
(2) Date: Sep. 30, 2023

(87) PCT Pub. No.: WO2022/231897
PCT Pub. Date: Nov. 3, 2022

(65) Prior Publication Data
US 2024/0183451 A1 Jun. 6, 2024

(30) Foreign Application Priority Data

Apr. 29, 2021 (GB) ..................... 2106135

(51) Int. Cl.
*F16K 3/10* (2006.01)
*F16K 35/06* (2006.01)
*F16K 37/00* (2006.01)

(52) U.S. Cl.
CPC ............... *F16K 3/10* (2013.01); *F16K 35/06* (2013.01)

(58) Field of Classification Search
CPC ..... F16K 3/06; F16K 3/10; F16K 3/14; F16K 3/18; F16K 3/186; F16K 35/06;
(Continued)

(56) References Cited

U.S. PATENT DOCUMENTS 1,569,252 A * 1/1926 Barnes .................... F16K 5/222
251/161
3,521,665 A * 7/1970 Poulsen ................ F16K 3/0218
251/300
(Continued)

FOREIGN PATENT DOCUMENTS

CN        2515288 Y      10/2002
DE    102007024651 B4     7/2011
(Continued)

OTHER PUBLICATIONS

International Search Report related to Application No. PCT/US2022/025485; reported on Aug. 11, 2022.
(Continued)

*Primary Examiner* — Marina A Tietjen (57) ABSTRACT

A shut off valve for a hydraulic system is provided. The shut off valve comprises a wall of a hydraulic reservoir, a hydraulic fluid outlet, a valve seat, a valve plate, a valve arm, and a valve control shaft. The hydraulic reservoir is for holding hydraulic fluid. The hydraulic fluid outlet is formed through the wall. The valve seat is provided on an inner surface of the wall encircling the hydraulic fluid outlet. The valve seat has an engagement surface. The valve plate is shaped to engage with the engagement surface of the valve seat. The valve arm is connected between the valve plate and the valve control shaft. The valve control shaft is formed through the wall spaced apart from the hydraulic fluid outlet. The valve plate is configured to rotate about the valve control shaft between a first position in which the valve plate does not cover the valve seat, and a second position in which the valve plate covers the valve seat to shut off the hydraulic fluid outlet. The engagement surface of the valve seat is inclined, relative to a plane of rotation of the valve plate, between the first and second positions such that the valve (Continued)

plate is sealed against the engagement surface when the valve plate is in the second position.

15 Claims, 9 Drawing Sheets

(58) Field of Classification Search
CPC ................ F16K 37/00; F16K 37/0025; F16K 1/18–2285; F16K 3/04–10; F16K 3/30
USPC .................................. 251/179, 203, 298–300
See application file for complete search history.

(56) References Cited

U.S. PATENT DOCUMENTS

| | | | |
|---|---|---|---|
| 5,205,311 | A | 4/1993 | Wilkins |
| 6,050,293 | A | 4/2000 | Lin et al. |
| 6,464,203 | B1 | 10/2002 | Ishigaki et al. |
| 6,474,623 | B1 | 11/2002 | Davies |
| 6,502,598 | B2 | 1/2003 | Engelmann |
| 6,901,954 | B2 | 6/2005 | Liebert |
| 8,141,846 | B2 | 3/2012 | Gehrig et al. |

FOREIGN PATENT DOCUMENTS

| | | | | |
|---|---|---|---|---|
| DE | 102013005458 | A1 | | 10/2014 |
| GB | 532264 | A | | 1/1941 |
| KR | 101282221 | B1 | | 7/2013 |
| KR | 20190135683 | A | * | 12/2019 |
| SE | 520219 | C2 | | 6/2003 |
| WO | WO-03033950 | A1 | * | 4/2003 ............ F02B 37/183 |
| WO | 2013085044 | A1 | | 6/2013 |

OTHER PUBLICATIONS

Great Britain Search Report related to Application No. 2106135.3; reported on Aug. 11, 2021.
The Process Piping, "Introduction to Check Valves", 2020, The Wayback Machine, https://web.archive.org/web/20200509105316/ https://www.theprocesspiping.com/introduction-to-check-valves/.

* cited by examiner

HYDRAULIC VALVE

CROSS-REFERENCE TO RELATED APPLICATION

This Application is a 35 USC § 371 US National Stage filing of International Application No. PCT/US2022/025485 filed on Apr. 20, 2022 which claims priority under the Paris Convention to Great Britain Patent Application No. 2106135.3 filed on Apr. 29, 2021.

FIELD OF THE DISCLOSURE

The present disclosure relates to hydraulic systems. In particular, the present disclosure relates to a hydraulic system for a machine such as an off-road vehicle.

BACKGROUND

Hydraulic systems typically include a pump, a hydraulic actuator and a reservoir of hydraulic fluid. The components of the hydraulic system are typically fluidly connected by hydraulic pipes.

When one of the components of the hydraulic system requires servicing or replacing, the hydraulic fluid is normally drained from the system to allow the component to be accessed. This process may be inconvenient due to the volume of hydraulic fluid contained within the system. Furthermore, draining the hydraulic fluid from the system and subsequently adding the hydraulic fluid back into the system can result in potential contamination of the hydraulic fluid.

For some large hydraulic systems, having typically in excess of 4,000 litres of hydraulic fluid within the system, it is known to use a butterfly valve to isolate parts of the hydraulic system for servicing, rather than having to drain the hydraulic fluid from the hydraulic system. A butterfly valve is a type of valve which includes a disc mounted on a rod. When the butterfly valve is closed, the disc is turned such that it completely block the valve. The valve can be opened by rotating the disc through 90° about an axis running through a diameter of the disk.

SUMMARY

According to a first aspect of the disclosure a shut off valve for a hydraulic system is provided. The shut off valve comprises a wall of a hydraulic reservoir, a hydraulic fluid outlet, a valve seat, a valve plate, a valve arm, and a valve control shaft. The hydraulic reservoir is for holding hydraulic fluid. The hydraulic fluid outlet is formed through the wall. The valve seat is provided on an inner surface of the wall encircling the hydraulic fluid outlet. The valve seat has an engagement surface. The valve plate is shaped to engage with the engagement surface of the valve seat. The valve arm is connected between the valve plate and the valve control shaft. The valve control shaft is formed through the wall spaced apart from the hydraulic fluid outlet. The valve plate is configured to rotate about the valve control shaft between a first position in which the valve plate does not cover the valve seat, and a second position in which the valve plate covers the valve seat to shut off the hydraulic fluid outlet. The engagement surface of the valve seat is inclined, relative to a plane of rotation of the valve plate, between the first and second positions such that the valve plate is sealed against the engagement surface when the valve plate is in the second position.

The shut off valve according to the first aspect provides a way to shut off a hydraulic reservoir of hydraulic fluid, such as a hydraulic tank, from a hydraulic system. Accordingly, the shut off valve according to the first aspect provides a way to isolate components of a hydraulic system from the hydraulic reservoir. Closing such a shut off valve allows for components of a hydraulic system to be accessed or serviced without having to fully drain the hydraulic reservoir. For example, a user may operate the shut off valve to seal off the hydraulic fluid outlet by rotating the valve plate to the second position via rotation of the valve control shaft. Once shut off, the user may then disconnect/service components connected to the hydraulic fluid outlet (e.g. a hydraulic actuator or a hydraulic pump) without having to drain the hydraulic fluid from the hydraulic reservoir.

The shut off valve of the first aspect provides a valve plate which is rotatable between a first position in which the hydraulic fluid outlet is fully open to the hydraulic reservoir, and a second position in which the hydraulic fluid outlet is sealed off from the hydraulic reservoir. Such a configuration provides an improvement over the butterfly valves known in the art, which cannot fully open. Furthermore, the inclined engagement surface of the valve seat of the forms a seal as the valve plate rotates into the second position which reduces and/or eliminates leak paths in the second position, relative to the butterfly valves known in the art. As such, the valve plate forms an interference fit with the engagement surface when the valve plate is in the second position.

The shut off valve is integrated into a wall of a hydraulic reservoir. As such, the shut off valve can be provided within a hydraulic reservoir in order to shut off the hydraulic reservoir from the rest of the hydraulic system. As the shut off valve may be contained within the hydraulic reservoir, the shut-off valve can be integrated into a hydraulic system in a space efficient manner. For example, the valve may be contained, or easily integrated into, a hydraulic reservoir of a hydraulic machine. That is to say, the shut off valve of the first aspect may be retrofitted into existing hydraulic systems, as it may be provided within (or replace) an existing hydraulic reservoir of the hydraulic system.

Furthermore, the shut off valve of the first aspect is particularly well suited to implementations in a hydraulic tank (or other reservoirs of hydraulic fluid) in which fluid flows through a hydraulic fluid outlet in primarily one direction. For example, in some hydraulic systems, a hydraulic fluid outlet may be connected to a hydraulic pump in order to pump hydraulic fluid. In such cases, the shut off valve is well suited to allowing fluid flow in one direction (from the hydraulic reservoir to the hydraulic pump) in the first position and blocking fluid flow in the second position.

One particular problem associated with known butterfly valves in the art is that the valves must be made to a high degree of machining precision, particularly for large valves used in high-volume hydraulic systems (e.g. 4,000 litre hydraulic systems). The butterfly valves typically need to be made with a tolerance of about ±0.1 mm to ensure that the butterfly valve does not leak. Such machining tolerances mean that butterfly valves for hydraulic systems are relatively expensive to manufacture. By contrast, the shut off valve of the first aspect uses an interference fit between the valve seat and the valve plate to close the valve. Such a design can be manufactured leak-free with machining tolerance of about ±1 mm. The relaxed machining tolerance means that the shut off valve is more economic to manufacture.

The shut off valve is integrated into a wall of a hydraulic reservoir. In some embodiments, the shut off valve may be provided as part of a hydraulic reservoir. In some embodiments, the shut off valve may be provided for installation (or retrofitting) into a hydraulic reservoir, by installing the wall in which the shut off valve is formed into a hydraulic reservoir. As such, the wall in which the shut off valve is formed may provide at least a portion of a wall of a hydraulic reservoir. The wall of the hydraulic reservoir in which the shut off valve is provided may be any surface (wall) of a hydraulic reservoir (e.g. a side wall, a bottom wall etc.). The wall of the hydraulic reservoir may be a generally planar surface, but may include a curved, convex, or concave portions according to the space constraints in which the hydraulic reservoir is to be provided. For example, in some embodiments, the wall of the hydraulic reservoir comprises a plate configured to be installed in an aperture of a hydraulic reservoir.

In some embodiments, the engagement surface of the valve seat is inclined relative to a plane of rotation of the valve plate by at least 1° and no greater than 10°. By controlling the angle of inclination, the force required to form the interference fit may be controlled.

In some embodiments, the valve arm is provided on an opposing side of the valve plate to the valve seat. As such, the valve arm resiliently biases the valve plate against the engagement surface of the valve seat to seal the shut off valve in the second position.

In some embodiments, the valve plate is connected to the valve arm at a centre of the valve plate, wherein the valve plate is rotatable with respect to the valve arm about the centre of the valve plate. By allowing the valve plate to rotate about the valve arm, the valve plate may rotate as it comes into contact with the engagement surface of the valve seat as the valve plate moves from the first position to the second position (or vice versa). Such rotation may reduce the force required to move the valve plate from the first position to the second position, thereby reducing wear on the valve plate and/or making the shut off valve easier to operate.

In some embodiments, the valve plate is a circular plate. In other embodiments, the valve plate may be elliptical. In some embodiments, the valve seat encircles the hydraulic fluid outlet such that valve seat has a generally cylindrical shape. That is to say, the valve seat encircles the hydraulic fluid outlet in a generally circular, or elliptical manner. As such, the engagement surface of the valve seat may have a generally annular shape. Of course, other shapes for the valve seat may be provided, such as rectangular, hexagonal, octagonal or any other irregular or regular polygon. The valve seat may have a shape which generally conforms to the shape of the valve plate, or may have a substantially different shape, providing that a suitable seal can be formed between the valve plate and the valve seat in the second position.

In some embodiments, a centre of the engagement surface of the valve seat is offset from the plane of rotation of the valve plate in a direction normal to the plane of rotation of the valve plate such that the valve arm bends when moving from the first position to the second position. Thus, the valve arm resiliently biases the valve plate against the valve seat when the valve plate is in the second position. By bending the valve arm in the second position (relative to the first position), the valve arm effectively acts as a spring in the second position to provide an additional closing force. The force applied by the valve arm depends on the degree of bending and the stiffness of the valve arm.

In this disclosure, the plane of rotation of the valve plate is understood to be the plane in which the valve plate rotates (or would rotate) about the valve shaft in the absence of any bending of the valve arm. That is to say, it is understood that a centre of the engagement surface of the valve seat may be offset from the plane of rotation of the valve plate such that the valve arm bends in a direction generally transverse to the plane of rotation.

In some embodiments, a ramp guide is provided adjacent to the valve seat, the ramp guide comprising a ramp surface inclined between the first and second positions of the valve plate. The ramp guide is configured to guide the valve plate as it rotates from the first position to the second position. As such, in some embodiments, the centre of the engagement surface of the valve seat may be offset from the plane of rotation of the valve plate such that the engagement surface does not intersect the plane of rotation. In such cases, the ramp guide may be provided in the path of the valve plate travelling between the first and second positions to guide the valve plate towards the engagement surface of the valve seat.

In some embodiments, the bending of the valve arm provides a spring force of at least 50 N to seal the valve plate against the engagement surface of the valve seat in the second position. In some embodiments, the spring force provided may be at least: 100 N, 200 N, 500 N, 1000 N, 1200 N, 1300 N, or 1500 N. It will be appreciated that, in use, the fluid in the hydraulic reservoir may also provide an additional force acting on the valve plate to seal the valve plate against the valve seat. Accordingly, the valve arm may be configured to provide a suitable force to seal the valve plate against the valve seat in the second position.

In some embodiments, the shut off valve may also comprise a first sensor configured to detect when the valve plate is in the first position, and/or a second sensor configured to detect when the valve plate is in the second position. Accordingly, the shut off valve may be provided with sensors which output a control signal to a controller or safety system to only allow operation of the hydraulic system when a sensor detects that the valve plate is in the first position. The shut off valve may also be provided with a sensor to detect when the valve plate is in the second position which outputs a control signal to a controller or safety system which allows components of the hydraulic system to be serviced/disconnected when the sensor detects that the valve plate is in the second position.

In some embodiments, the shut off valve further comprises a first castellation configured to abut the valve arm in the first position, and a second castellation configured to abut the valve in the second position. The first and second castellations define the range of rotation of the valve plate between the first and second positions. As such, the shut off valve may be provided with mechanical stops (castellations) to prevent over rotation of the valve plate. The castellations also define fixed (end) points for the valve plate as the first and second positions to allow a user to identify when the valve plate is in the desired (first or second) position.

In some embodiments, the shut off valve further comprises a locking pin assembly comprising a locking pin, a first position locking pin receiver, and a second position locking pin receiver. The locking pin assembly is configured to lock the valve control shaft in the first position or the second position. As such, the locking pin assembly provides a simple mechanism for a user to locate the shut off valve in one of two positions.

According to a second aspect of the disclosure, a hydraulic system is provided. The hydraulic system comprises a hydraulic reservoir configured to hold hydraulic fluid, the hydraulic reservoir comprising at least one wall, a hydraulic fluid outlet formed through the wall of the hydraulic reservoir, a hydraulic pump fluidly connected to the hydraulic fluid outlet, and a shut off valve. The shut off valve comprises a valve seat, a valve plate, a valve arm, and a valve control shaft. The valve seat is provided on an inner surface of the wall encircling the hydraulic fluid outlet, the valve seat having an engagement surface. The valve plate is shaped to engage with an engagement surface of the valve seat. The valve control shaft is formed through the wall spaced apart from the hydraulic fluid outlet. The valve arm is connected between the valve plate and the valve control shaft. The valve plate is configured to rotate about the valve control shaft between a first position in which the valve plate does not cover the valve seat, and a second position in which the valve plate covers the valve seat to shut off the hydraulic fluid outlet from the hydraulic fluid reservoir. The engagement surface of the valve seat is inclined, relative to a plane of rotation of the valve plate, between the first and second positions such that the valve plate is sealed against the engagement surface when the valve plate is in the second position.

As such, the shut off valve of the first aspect of the disclosure may be incorporated into a hydraulic system according to the second aspect of the disclosure.

In some embodiment, the hydraulic system further comprises a first sensor configured to detect when the valve plate is in the first position, wherein the hydraulic pump is not operable, or issues an alert, when the first sensor does not detect that the valve plate is in the first position. As such, the shut-off valve may be configured to prevent operation of the hydraulic system when the shut-off valve is not fully open (i.e. in the first position). In some embodiments, the hydraulic system may issue an alert when the first sensor detects that the valve plate is not in the first position. For example, an alert may be sent to a controller for the hydraulic system to issue a warning to the operator. Alternatively, a buzzer may sound to alert the operator that the valve plate is not in the first position.

According to a third aspect of the disclosure a hydraulic machine comprising the hydraulic system of the second aspect is provided. The hydraulic machine may be, for example, an off-road vehicle, a backhoe, a dump truck, a crane, a wheel loader, an excavator, a mining shovel, an extruder or a hydraulic press.

It will be appreciated the second and third aspects of the disclosure may incorporate the optional features and associated advantages of the first aspect described above.

BRIEF DESCRIPTION OF THE FIGURES

The invention will now be described in relation to the following non-limiting figures. Further advantages of the disclosure are apparent by reference to the detailed description when considered in conjunction with the figures in which.

DETAILED DESCRIPTION

According to a first embodiment, a shut off valve 1 for a hydraulic system is provided. An isometric view of the shut off valve 1 is shown in FIG. 1.

The shut off valve 1 comprises a wall 2 of a hydraulic reservoir for holding hydraulic fluid, a hydraulic fluid outlet 4 formed through the wall 2, a valve plate 10, a valve seat 20, a valve arm 30, and a valve control shaft 40.

Figure 1:
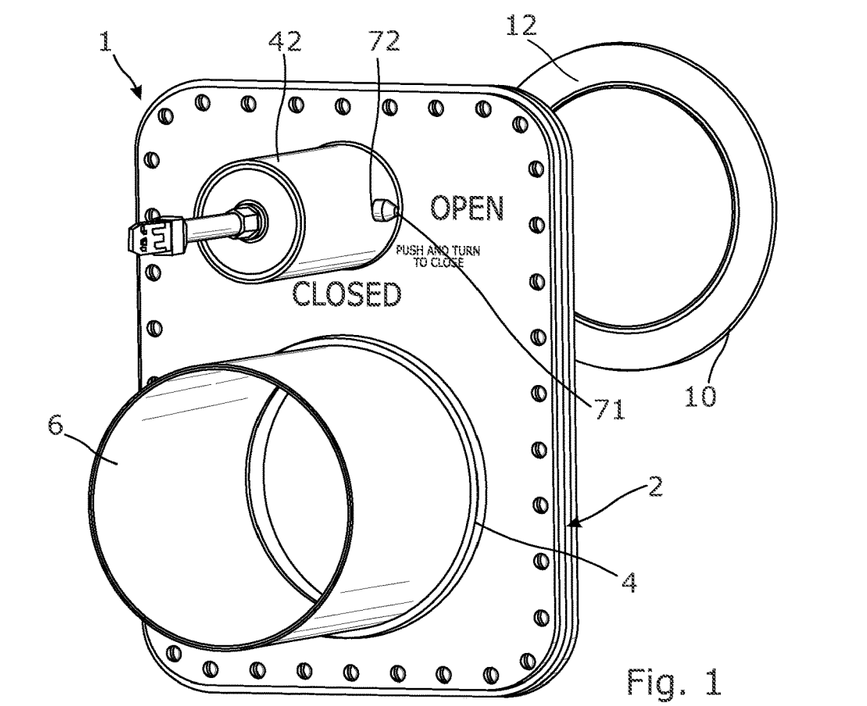
FIG. 1 shows a front isometric view of a shut off valve according to a first embodiment of the disclosure in which the valve plate is in the first position.

As shown in FIG. 1, the wall 2 of the hydraulic reservoir is generally planar wall. As such, the wall 2 may be formed from a metal plate. The wall 2 is configured to be installed into a suitably sized aperture of a hydraulic reservoir (not shown). In some embodiments, the shut off valve 1 may be provided as part of a hydraulic reservoir. In some embodiments, the shut off valve 1 may be provided for installation (or retrofitting) into a hydraulic reservoir, by installing the wall 2 in which the shut off valve 1 is formed into a hydraulic reservoir. In some embodiments, the wall 2 may be installed into an inspection hatch for a hydraulic reservoir.

The hydraulic fluid reservoir (not shown) provides a volume for holding hydraulic fluid. For example, the hydraulic fluid reservoir may be a hydraulic tank configured to supply hydraulic fluid to a hydraulic pump.

The hydraulic fluid outlet 4 is formed through the thickness of the wall 2. As shown in FIG. 1, the hydraulic fluid outlet 4 defines a generally circular aperture through the thickness of the wall 4. The hydraulic fluid outlet 4 may include a connecting portion 6. The connecting portion 6 may comprise a section of tubing to allow the hydraulic fluid outlet 4 to be connected to other components of a hydraulic system.

The valve plate 10 shown in FIG. 1 comprises a metal plate. The valve plate 10 has a generally circular shape. The valve plate 10 includes a sealing surface 12 which may be provided on the major, exterior-facing surface of the valve plate 10. The sealing surface 12 is configured to engage with the valve seat 20. In the embodiment of FIG. 1, the sealing surface 12 is an annular surface which encircles a central region of the valve plate 10. The valve plate 10 is shaped to cover circular aperture of the hydraulic fluid outlet 4 and also the engagement surface 22 of the valve seat 20.

Figure 2:
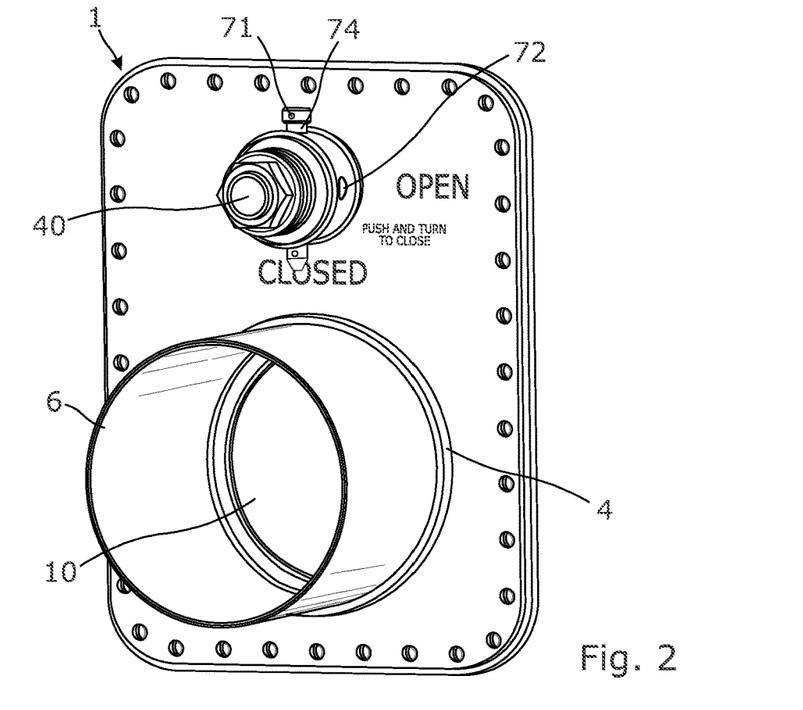
FIG. 2 shows a front isometric view of the shut off valve according to the first embodiment of the disclosure in which the valve plate is in the second position.

As shown in FIGS. 1 and 2, the valve plate 10 may rotate between a first and second position of the shut off valve 1. In FIG. 1, the valve plate 10 is in the first position in which the valve plate does not cover the valve seat 20. As such, when the valve plate 10 is in the first position, hydraulic fluid may flow from the hydraulic reservoir through the hydraulic fluid outlet 4.

Figure 3:
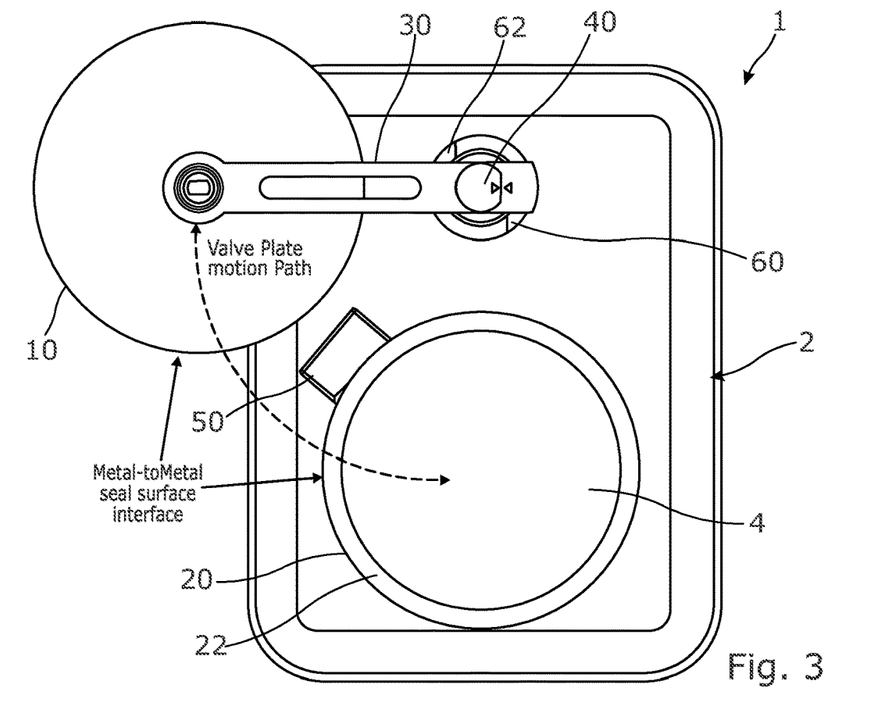
FIG. 3 shows a rear view of the shut off valve according to the first embodiment of the disclosure in which the valve plate is in the first position.
Figure 4:
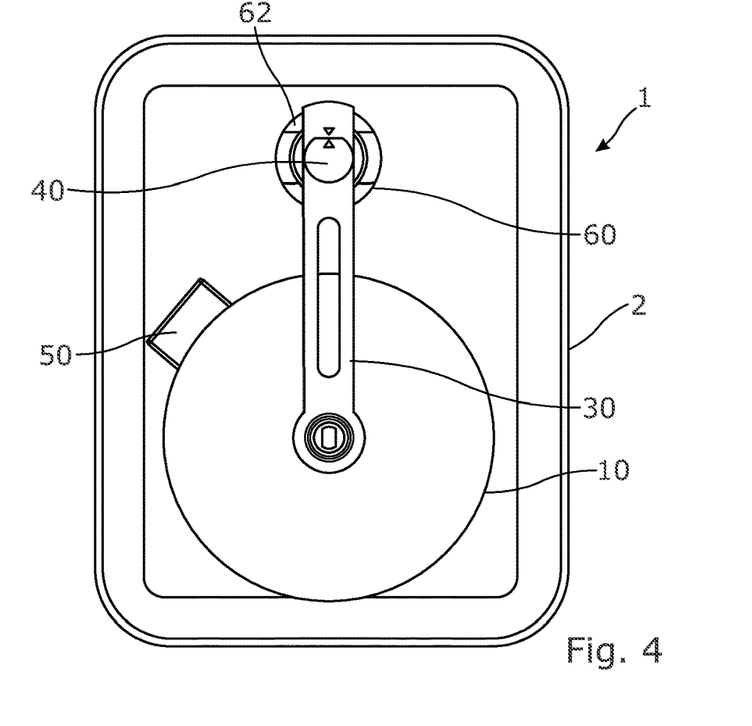
FIG. 4 shows a rear view of the shut off valve according to the first embodiment of the disclosure in which the valve plate is in the second position.

In FIG. 2, the valve plate 10 is in the second position. In the second position, the valve plate 10 covers the valve seat 20 to shut off the hydraulic fluid outlet 4. In the second position, the sealing surface 12 of the valve plate 10 engages with the engagement surface 22 of the valve seat 20. As such, in the second position, the valve plate 10 prevents hydraulic fluid from flowing from the hydraulic reservoir through the hydraulic fluid outlet 4. FIGS. 3 and 4 show further views of the valve plate 10 in the first and second positions, when viewed from the opposite side of the wall 2 (viewing the interior surface of the wall 2) to the views shown in FIGS. 1 and 2.

As shown in FIGS. 3 and 4, the valve plate rotates about 90° between the first and second positions. In other embodiments, other amounts of rotation may be provided between the first and second positions. In some embodiments, the amount of rotation provided may be an amount of rotation sufficient to prevent the valve plate from overlapping the hydraulic fluid outlet 4 when the valve plate is in the second position. The amount of rotation will depend on the relative sizes of the valve plate 10, the valve arm 30, and the hydraulic fluid outlet 4.

Figure 5:
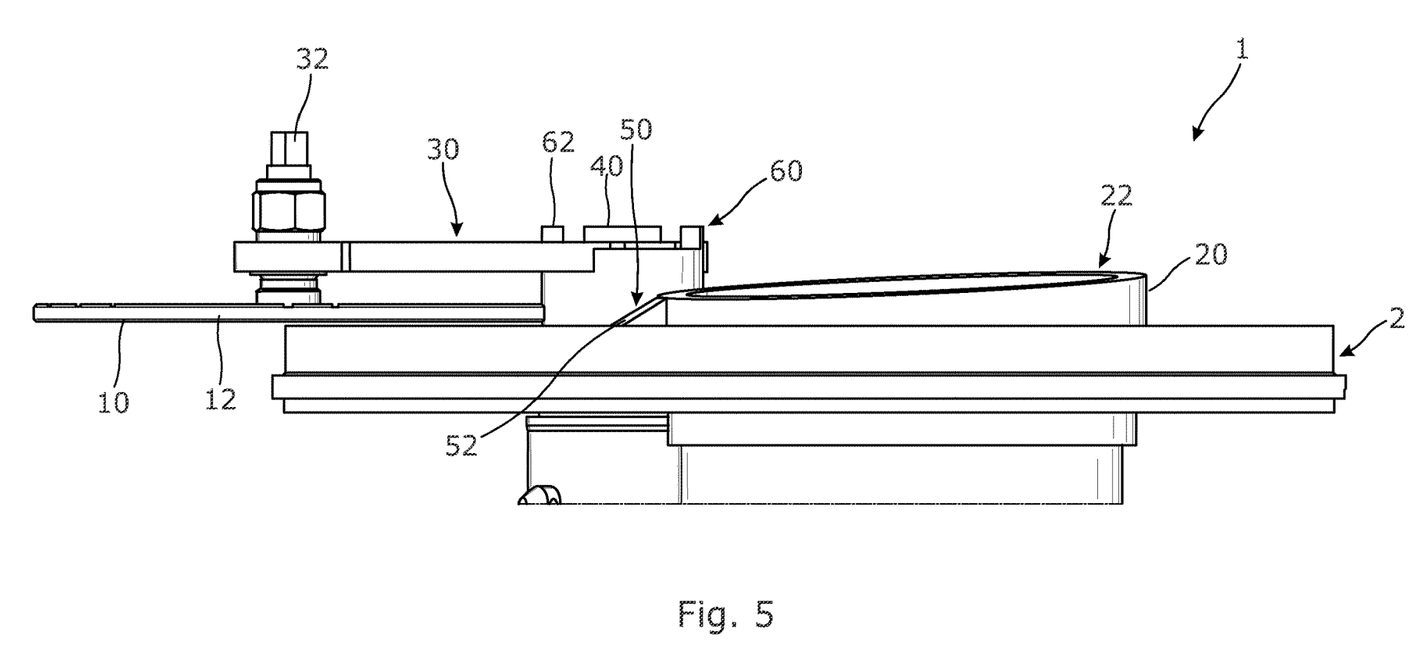
FIG. 5 shows a side view of the shut off valve according to the first embodiment of the disclosure in which the valve plate is in the first position.

FIG. 5 shows a side on view of the shut off valve 1. In FIG. 5, the valve plate 10 is in the first position. As the valve plate 10 moves through a small angle from the first position e.g. 5°, it will be appreciated that the sealing surface 12 of the valve plate 10 rotates through a plane of rotation that is generally aligned with the planar interior surface of the wall 2. This plane of rotation is considered to be the plane of rotation of the valve plate. It will be appreciated from FIG. 5 that as the valve plate 10 moves towards the second position, the valve plate 10 is guided out of the plane of rotation by the ramp guide 50 and the engagement surface 22 of the valve seat 20.

The valve seat 20 extends from the wall 4. The valve seat 20 is formed on an interior surface of the wall 4 (i.e. the surface of the wall which forms an internal surface of the hydraulic fluid reservoir). The valve seat 20 encircles the hydraulic fluid outlet 4. As shown in FIG. 3, the valve seat 20 encircles the hydraulic fluid outlet 4 such that an inner radius ($r_1$) of the valve seat 20 is the same as the radius of the hydraulic fluid outlet 4.

As shown in FIG. 5, the valve seat 20 extends from the interior surface of the wall 4. As such, the engagement surface 22 of the valve seat 20 is offset from the interior surface of the wall 4. As shown in FIG. 5, the engagement surface 22 is inclined relative to the plane of rotation of the valve plate 10. The engagement surface 22 is inclined in a direction between the first and second positions such that the valve plate 10 moves up the inclination as it moves from the first position to the second position. Accordingly, the valve plate 10 is sealed against the engagement surface 22 as it moves from the first position to the second position. The seal formed is essentially an interference fit between the valve plate 10 and the engagement surface 22 of the valve seat 20.

As shown in FIG. 5, the engagement surface 22 is also offset from the plane of rotation of the valve plate 10. As such, a centre of the engagement surface 22 of the valve seat 20 is offset from the plane of rotation of the valve plate in a direction normal to the plane of rotation of the valve plate such that the valve arm bends when moving from the first position to the second position. In the first embodiment, the amount of offset is such that the engagement surface 22 of the valve seat 20 does not intersect with the plane of rotation of the sealing surface 12 of the valve plate 10. In order to guide the sealing surface 12 of the valve plate 10 as the valve plate 10 rotates between the first and second position, a ramp guide 50 may be provided.

Ramp guide 50 may be provided on the wall 2 adjacent to the valve seat 20. The ramp guide 50 comprises a ramp surface 52. The ramp surface 52 is inclined between the first and second positions of the valve plate 10, in a similar manner to the engagement surface 22 of the valve seat 20 (but necessarily the same angle of inclination). The ramp guide 50 is configured to guide the valve plate 10 as it rotates from the first position to the second position.

In order to provide for the rotation of the valve plate 10, the valve plate 10 is connected to the valve arm 30. Valve arm 30 connects the valve plate 10 to the valve control shaft 40. As shown in FIGS. 1-5, the valve plate 10 may be connected to the valve arm 30 at a centre of the valve plate 10. Further, the valve plate 10 may be connected to the valve arm 30 such that the valve plate 10 is rotatable with respect to the valve arm 30 about the centre of the valve plate 10. As shown in FIG. 5, the valve plate 10 may be connected to the valve arm 30 using a suitable fastener 32 such that the valve plate 10 can freely rotate about its central point.

As shown in FIG. 5, the valve arm 30 may be provided on an opposing side of the valve plate 10 to the valve seat 20. As such, the valve arm 30 may be connected to the valve plate 10 on the opposite side of the valve plate 10 to the sealing surface 12.

As discussed above, the valve arm 30 may be configured to bend as the valve plate 10 rotates from the first position to the second position. As the valve arm 30 moves to the second position, the bending of the valve arm 30 may provide a spring force to seal the valve plate 10 against the valve seat 20. The spring force provided depends on the bending stiffness of the valve arm 30 and the amount of bending of the valve arm 30 in the second position. In some embodiments, the valve arm 30 provides a spring force of at least 50 N to seal the valve plate 10 against the engagement surface 22 of the valve seat 20 in the second position. In the embodiment of FIG. 5, the valve arm 30 may provide a spring force of about 1300 N. The bending stiffness of the valve arm 30 will depend on the design of the valve arm 30. As shown in FIGS. 3 and 4, the valve arm 30 comprises a generally elongate bar with a central section removed. Other designs for the valve arm 30 will be apparent to the skilled person.

Figure 6:
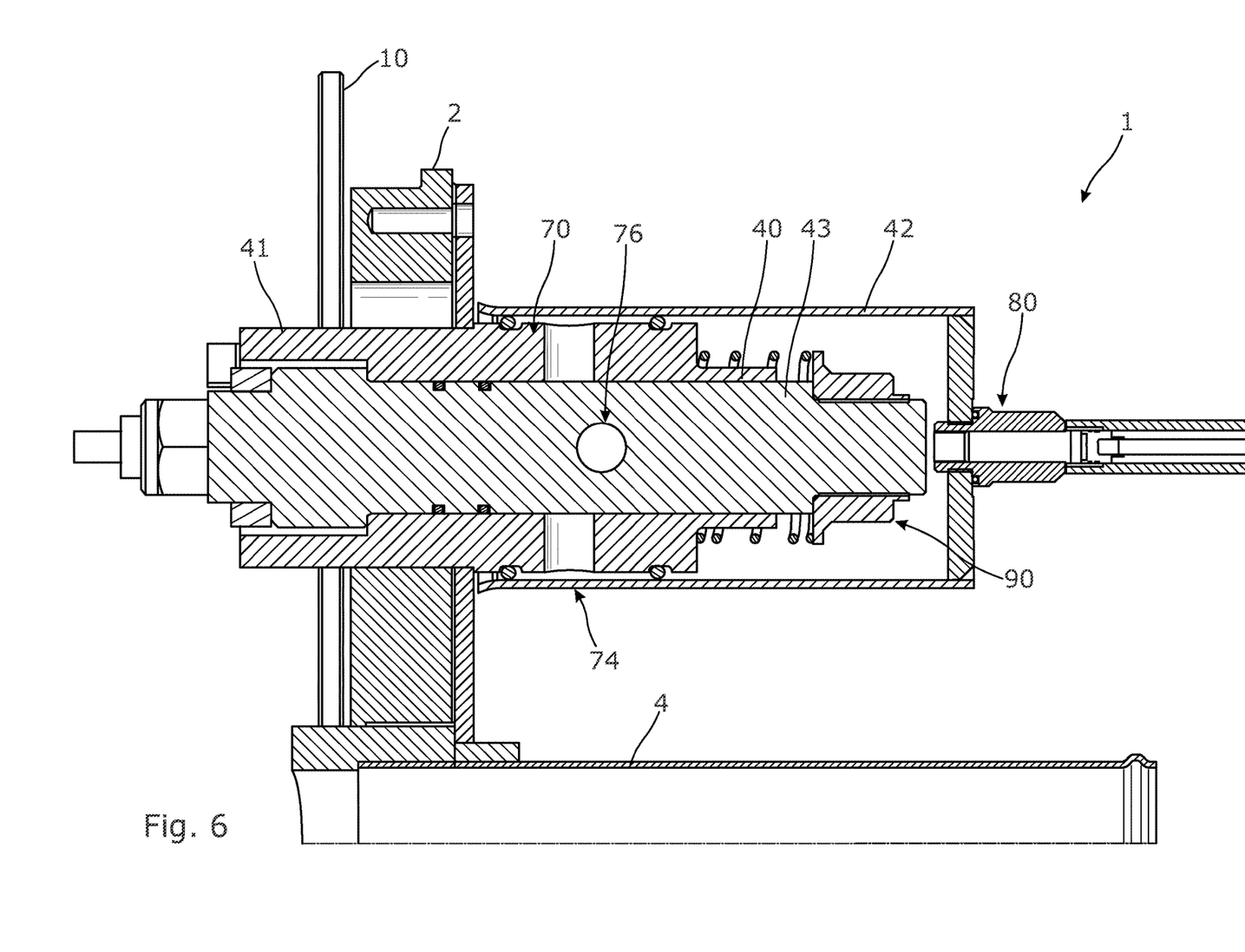
FIG. 6 shows a cross sectional view of the shut off valve through a central axis of the valve control shaft according to the first embodiment of the disclosure in which the valve plate is in the first position.

The valve control shaft 40 is connected to the valve arm 30 at an opposite end of the valve arm 30 to the valve plate 10. FIG. 6 shows a cross sectional view of the shut off valve 1 through a central axis of the valve control shaft 40. As shown in FIG. 6, the valve control shaft 40 is provided through the wall 2 at a point spaced apart from the hydraulic fluid outlet 4. As shown in FIG. 6, the valve control shaft 40 is a generally elongate shaft having a central axis which extends generally normal to the interior surface of wall 2. The valve control shaft 40 is rotatable about the central axis of the valve control shaft 40 in order to provide the rotation of the valve plate 10 between the first and second positions.

In order to locate the valve control shaft 40 in the wall 2, a valve control shaft housing 41 may be provided. As shown in FIG. 6, the valve control shaft housing 41 is configured to locate the valve control shaft 40 relative to the hydraulic fluid outlet 4. The valve control shaft 40 rotates within the valve control shaft housing 41. The valve control shaft housing 41 is located within an aperture formed thought the thickness of the wall 2.

As shown in FIG. 6, the valve control shaft 40 is elongated such that it extends through the wall 2 and protrudes from the exterior surface of the wall 2. The protruding portion of the valve control shaft 43 may be manipulated by a user to move the valve control plate 10 between the first and second positions without needing to access the interior of the hydraulic reservoir. For example, in the embodiment of FIG. 6, a flange nut 90 provides an interface for a user to actuate the shut off valve 1.

The valve control shaft 40 may be covered by a valve control shaft cover 42. As shown in FIG. 6, the valve control shaft cover 42 is configured to cover the exterior portion 42 of the valve control shaft 40. As such, the valve control shaft cover 42 may be provided to prevent unintended access to the flange nut 90. The valve control shaft cover 42 may be removed in order to allow a user to access the flange nut 90.

The valve control shaft cover 42 may comprise a sensor 80. Sensor 80 may comprise a proximity sensor which is configured to detect when the shut off valve 1 is in the first position. For example, the sensor 80 may detect the proximity of a pin (not shown) at the end of the valve control shaft 40. Sensor 80 may be connected to a processor, such as a hydraulic control unit in order to relay information about the position of the shut of valve to the processor. As the sensor 80 is fitted to the valve control shaft cover 42, sensor 80 may only detect that the shut off valve 1 is in the first position when the valve control shaft cover 42 is fitted to the shut off valve 1. The processor may the control the hydraulic system on the basis of the information from the sensor 80. That is to say, the processor may prevent operation of the hydraulic system unless the valve control shaft cover 42 is installed and the sensor 80 detects that the shut off valve 1 is in the first position.

In some embodiments, a further sensor (not shown) may also be provided to detect when the shut off valve 1 is in the second position. The further sensor may be attached to the valve control shaft cover 42, or any other part of the shut off valve 1.

Figure 7:
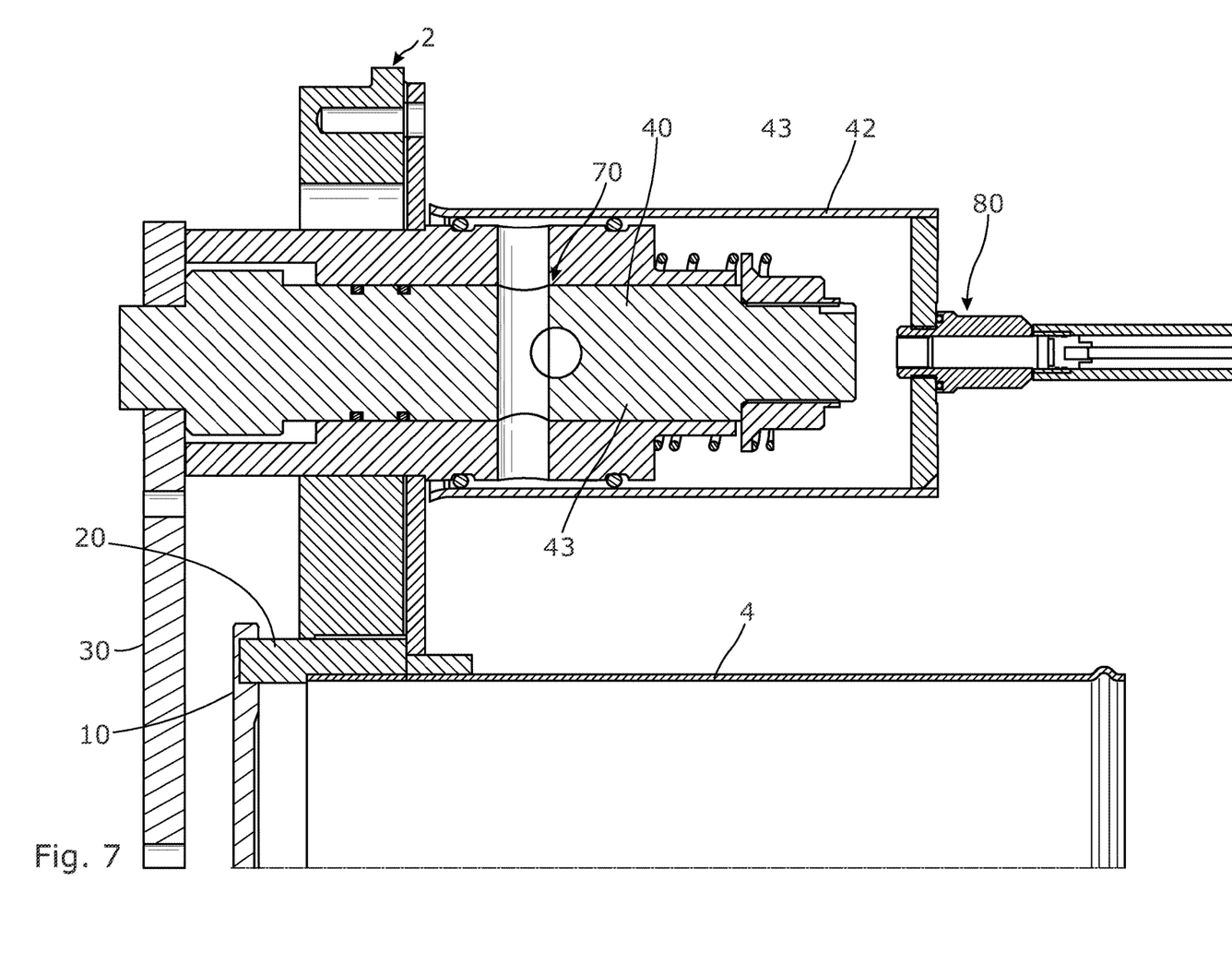
FIG. 7 shows a cross sectional view of the shut off valve through a central axis of the valve control shaft according to the first embodiment of the disclosure in which the valve plate is in the second position.
Figure 8:
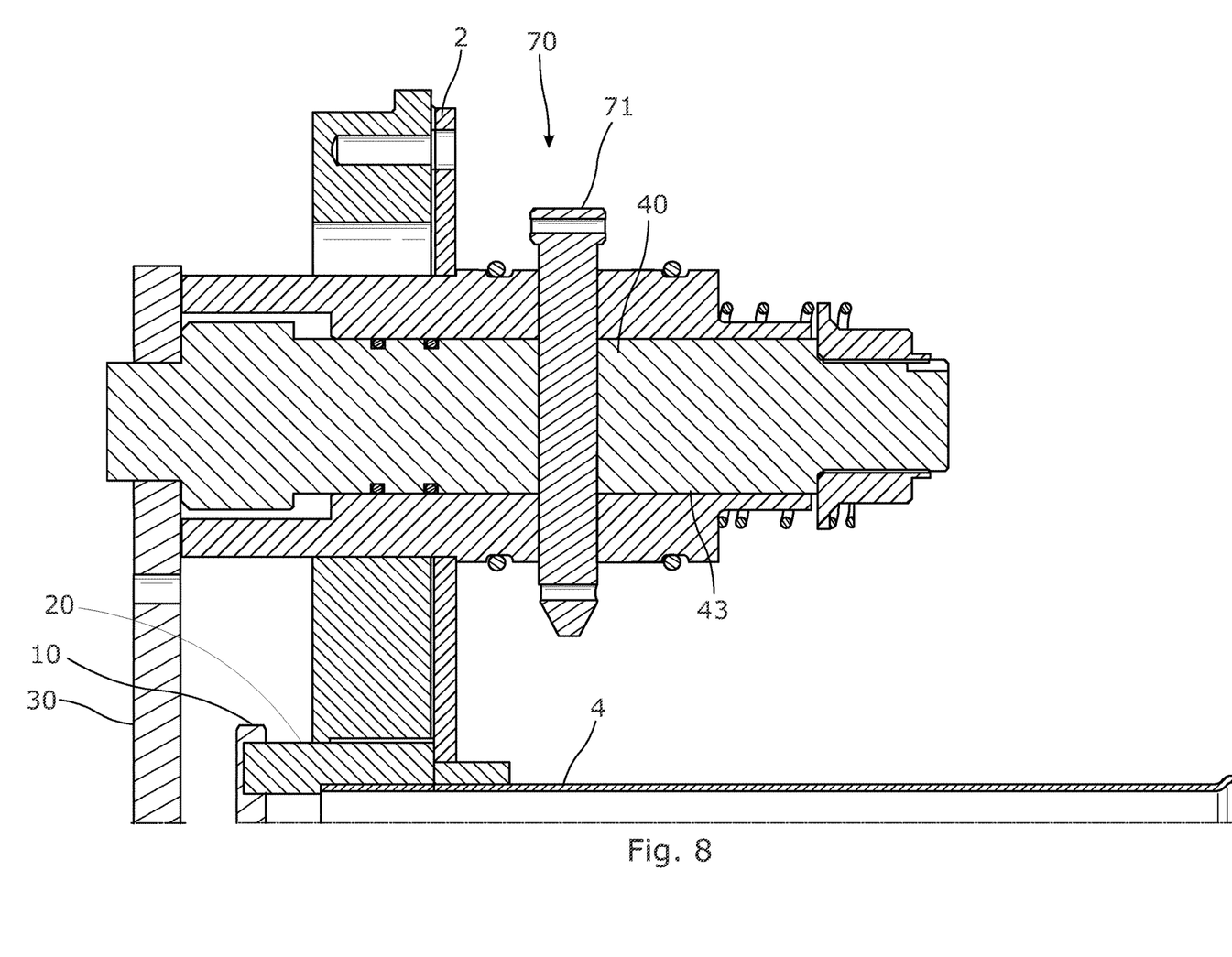
FIG. 8 shows a further cross sectional view of the shut off valve through a central axis of the valve control shaft according to the first embodiment of the disclosure in which the valve plate is in the second position.

FIG. 6 shows a cross section of the valve control shaft 30 in the first position. FIG. 7 shows a cross section of the valve control shaft 30 in the second position. As shown in FIGS. 6 and 7, a locking pin assembly 70 may be provided. The locking pin assembly 70 may be configured to lock the valve control shaft 40 in the first position or the second position. In the embodiment of FIG. 8, the locking pin assembly 70 is used to lock the shut off valve 1 in the second position.

The locking pin assembly 70 comprises a locking pin 71, a first position locking pin receiver 72, and a second pin locking pin receiver 74. As shown in FIG. 8, the valve control shaft 40 comprises an aperture 75 extending through a diameter of the valve control shaft 40 at a point along the protruding portion 43. The aperture 75 is configured to receive the locking pin 71. Thus, the locking pin 71 can be inserted through the aperture 75 in order to engage with the first locking pin receiver 72 or the second locking pin receiver 74 in order to lock the position of the valve control shaft 40 in the first or second position respectively.

As shown in FIG. 8, the second locking pin receiver 74 is provided as part of the valve control shaft housing 41. The second locking pin receiver 74 define an aperture for receiving the locking pin 71 in order to lock the position of the valve control shaft 40 relative to the shut-off valve 1. As shown in FIGS. 1 and 2, the first locking pin receiver 72 similarly defines an aperture of the control shaft housing 41 for locking the valve control shaft 40 in the first position.

Figure 9:
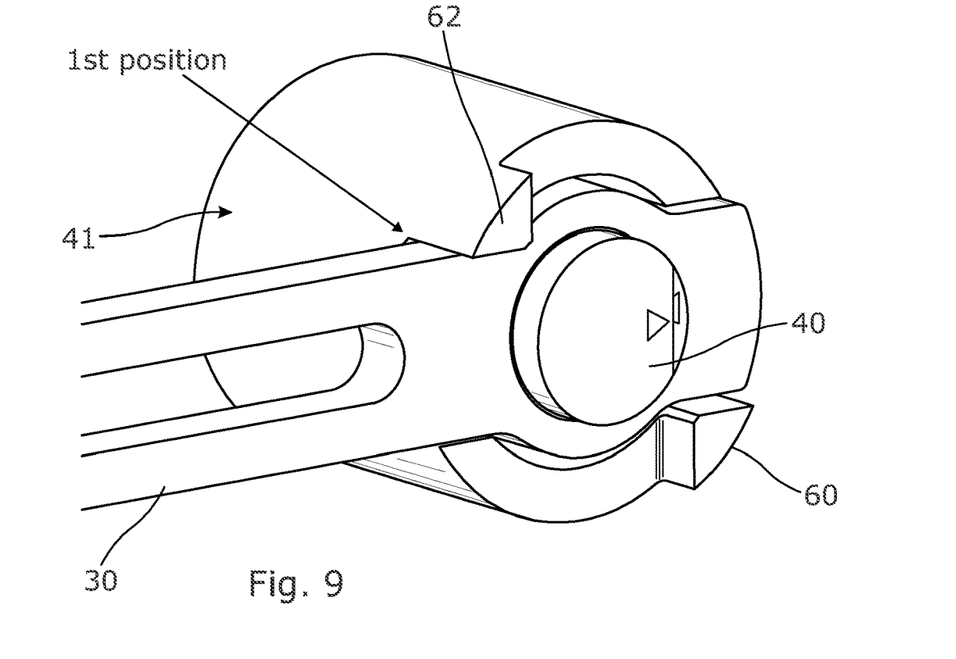
FIG. 9 shows a rear isometric view of the valve control shaft of the shut off valve according to the first embodiment, wherein the shut off valve is in the first position.
Figure 10:
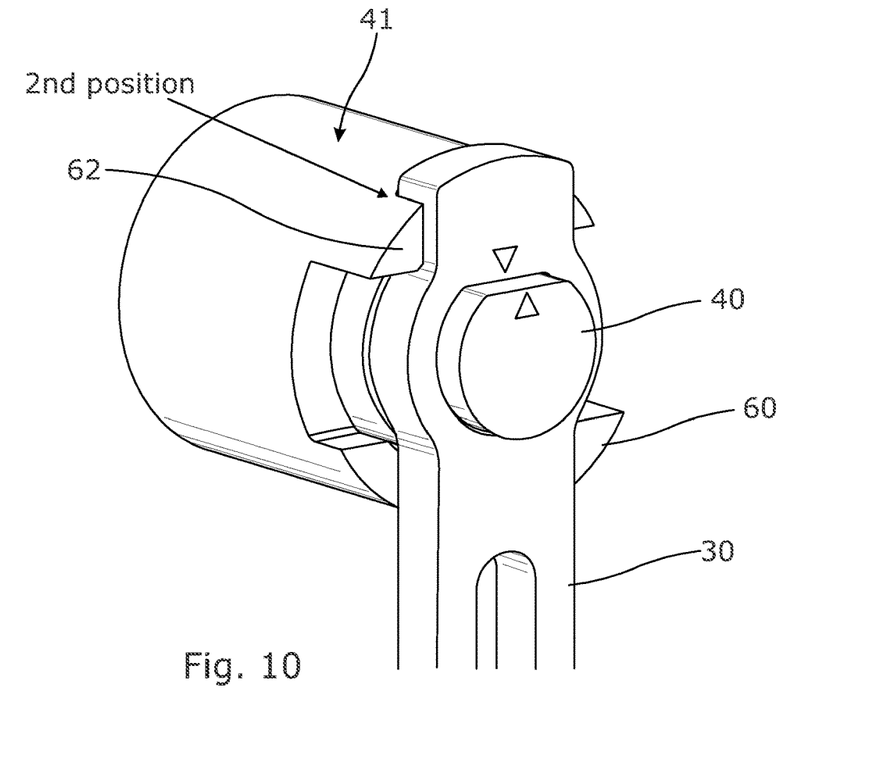
FIG. 10 shows a rear isometric view of the valve control shaft of the shut off valve according to the first embodiment, wherein the shut off valve is in the second position.

In some embodiments, the shut-off valve may also include a first castellation 60 configured to abut the valve arm 30 in the first position and a second castellation 62 configured to abut the valve arm 30 in the second position, the first and second castellations 60, 62 defining the range of rotation of the valve plate between the first and second positions. FIGS. 9 and 10 show isometric views of the first and second castellations 60, 62 provided on the shut-off valve of the first embodiment. The first castellation 60 is configured to abut the valve arm 30 in the first position. The second castellation 62 is configured to abut the valve arm 30 in the second position. As such, the first and second castellations 60, 62 define the range of rotation of the valve plate 10 between the first and second positions. As shown in FIGS. 9 and 10, the first and second castellations 60, 62 may be provided as part of the valve control shaft housing 41. The first and second castellations 60, 62 are protrusions of the valve control shaft housing 41 which protrude into the rotational path of the valve arm 30 in order to restrict the range of motion of the valve arm 30.

Figure 11:
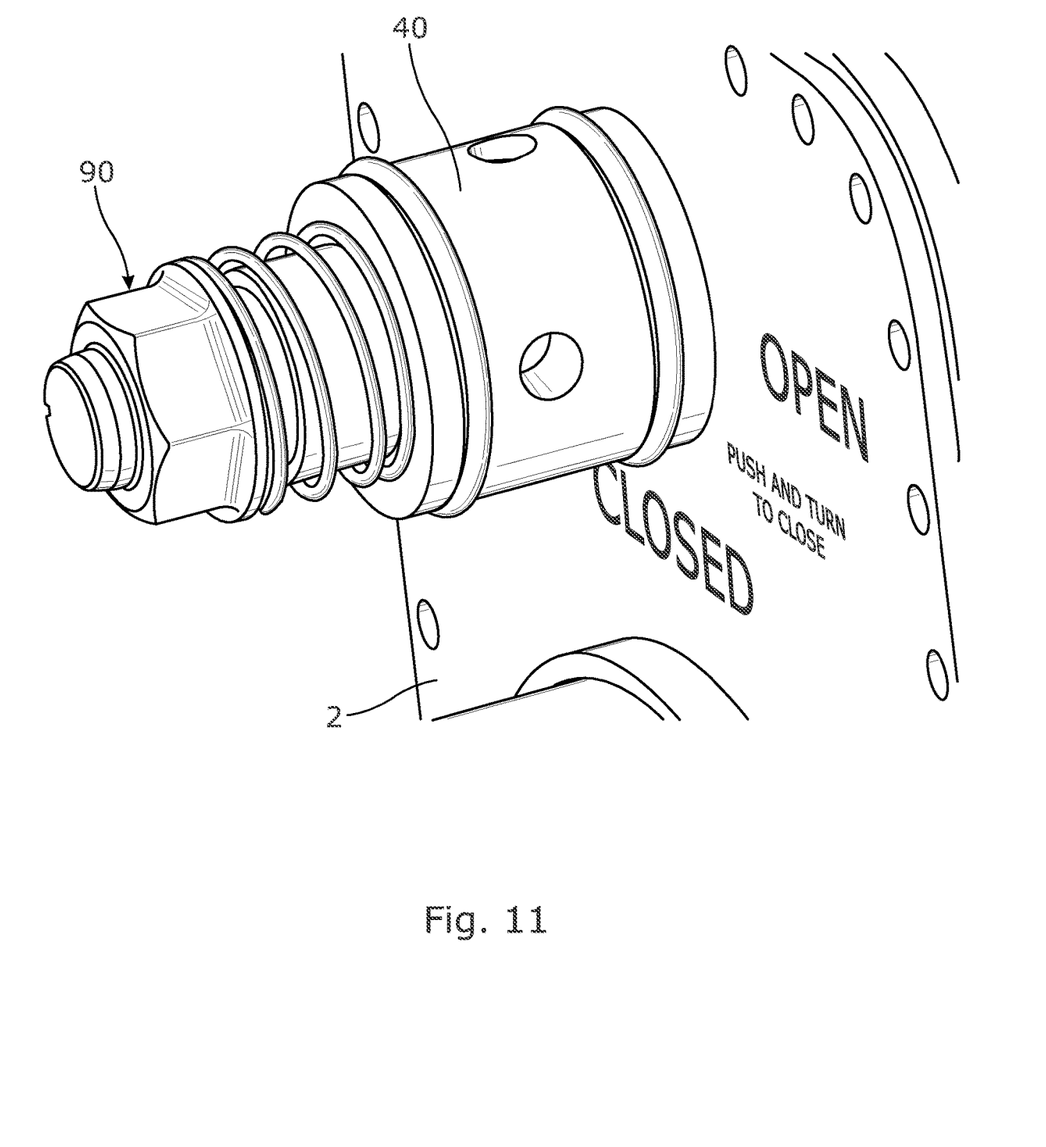
FIG. 11 shows a front isometric view of the valve control shaft of the shut off valve according to the first embodiment.

FIG. 11 shows a detailed isometric view of the flange nut 90 of the first embodiment which is provided at the exterior end of the valve control shaft 40. The flange nut 90 provides a surface for a user to manually adjust the position of the valve control shaft 40. The flange nut 90 also comprises a flange which encircles the valve control shaft 40 towards the exterior end of the valve control shaft 40.

In some embodiments, such as shown in the first embodiment, the valve control shaft 40 may be able to move in an axial direction aligned with the axis of rotation. Such movement may be provided to bias the shut off valve 1 towards the first position when the shut off valve 1 is not in the second position. As such, when the shut off valve 1 is at an intermediate position between the first and second positions, the valve plate 10 may not move freely, but rather may be biased to return to the first position in the absence of any external forces. Such a bias helps to provide a further means of ensuring that the valve plate 10 is in the first position when the hydraulic system is in use. As such, the range of motion allowed in the axial direction, is a range of motion which would apply a further sealing force to the valve plate 10 when the valve plate 10 is in the second position. That is to say, when the valve plate 10 is in the second position 10, the valve control shaft 40 cannot move axially further towards the interior of the hydraulic reservoir (i.e. the valve control shaft 40 cannot move axially to move the valve plate 10 away from the valve seat 20).

Figure 12:
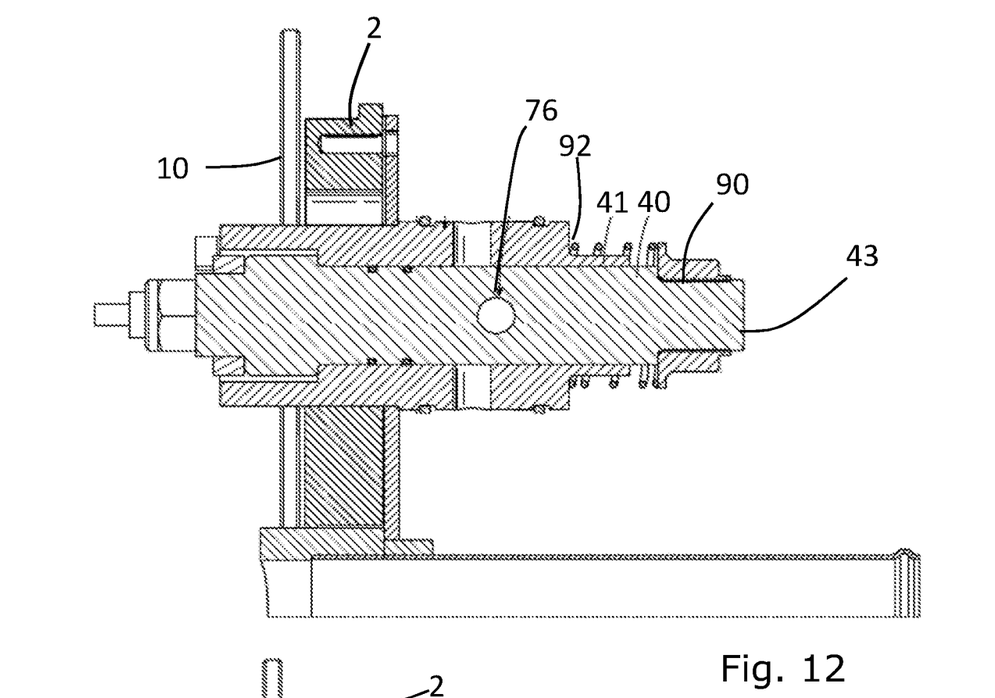
FIG. 12 shows a view of the valve control shaft in the axial resting position.
Figure 13:
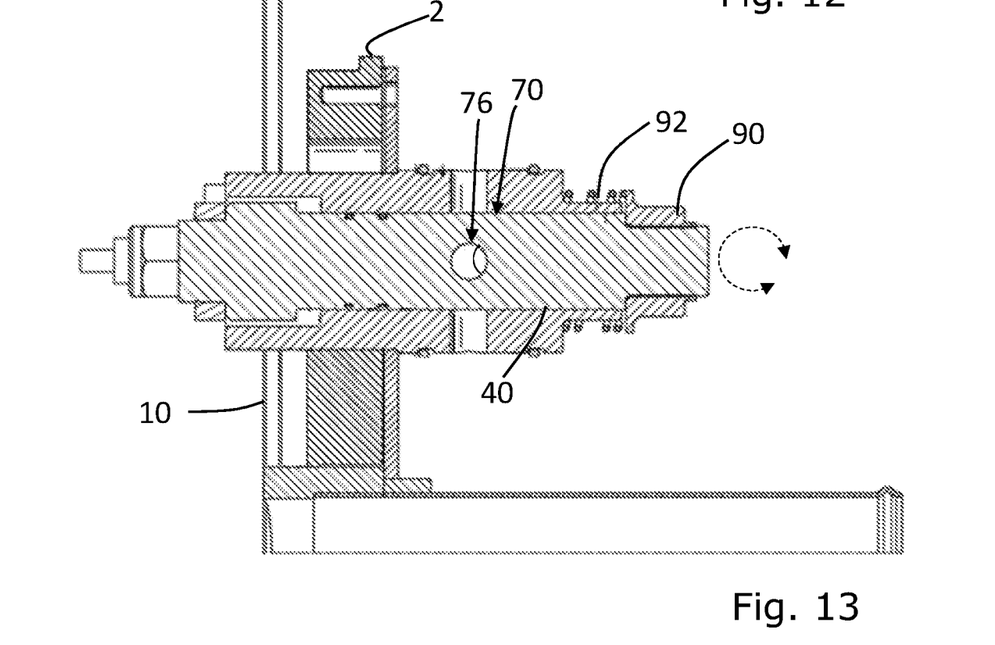
FIG. 13 shows a view of the valve control shaft in the axial depressed position.

In the first embodiment, as shown in FIGS. 12 and 13, the valve control shaft 40 has a degree of movement in its axial direction. The degree of movement is defined by the valve control shaft housing 41. The valve control shaft housing 41 allows the valve control shaft 40 to move in the axial direction between two positions, an axial resting position and an axial depressed position (the valve control shaft 40 can still rotate about its central axis at least to some degree in both positions). FIG. 12 shows the valve control shaft 40 in the axial resting position and FIG. 13 shows the valve control shaft 41 in the axial depressed position.

In the axial depressed position, the valve control shaft 40 is positioned axially in order to close the shut off valve in the second position. As such, in embodiments without axial movement of the valve control shaft, the valve control shaft 40 is essentially always in the axial depressed position.

In the axial depressed position, the valve arm 30 is moved away from the interior surface of the wall 2. In the first embodiment, when the valve control shaft 40 rotates from the first position to the second position when in the axial depressed position, the valve seat 20 engages with the valve plate 10 to bend the valve arm 30. The bending force of the valve arm 30 ensures that when the valve plate 10 is in the second positon, the valve control shaft 40 is in the axial depressed position.

To move from the axial depressed position to the axial resting position the valve control shaft 40 moves from the interior of the wall 2 towards the exterior of the wall 2. As such, the valve arm 30 moves towards the interior surface of the wall 2. In the second position, the valve arm 30 resists such movement, as this would cause further bending of the valve arm 30.

As shown in FIG. 11, a spring 92 is provided between the flange nut 90 and the valve control shaft housing 41. The spring 92 is provided to resiliently bias the flange nut 90 of the valve control shaft 40 away from the valve control shaft housing 41. As such the spring 92 provides a further spring force to bias the valve plate 10 towards the interior surface of the wall 2. As such, the spring force from spring 92 resiliently biases the valve control shaft 40 towards the axial resting position. As shown in FIG. 12, the spring 92 biases the valve control shaft 40 into the axial resting position when the valve plate 10 is in the first position. In FIG. 13, a force is applied to flange nut 90 to depress the valve control shaft 40 to the axial depressed position when the valve plate 10 is in the first position.

Accordingly, as shown in FIGS. 12 and 13, a user may apply a force to the valve control shaft 40 to depress the valve control shaft 40. The application of this force allows the valve plate 10 to move to the second position. As the valve control shaft 40 of the first embodiment benefits from application of axial force to move from the first position to the second position, the shut off valve 1 includes features to prevent the shut off valve 1 being inadvertently moved into the second position.

It will appreciated that the shut off valve 1 of the first embodiment may be provided as part of a hydraulic system (not shown). Such a hydraulic system may comprise a hydraulic reservoir configured to hold hydraulic fluid, a hydraulic pump, and the shut off valve of the first embodiment.

The hydraulic reservoir includes a hydraulic fluid outlet. The hydraulic fluid outlet is fluidly connected to the hydraulic pump by a suitable conduit.

In accordance with the first embodiment, the shut off valve 1 is provided in a wall of the hydraulic reservoir. As such, the shut off valve is provided to shut off the hydraulic fluid outlet of the hydraulic reservoir to control the flow of hydraulic fluid to the hydraulic pump.

In embodiments where one or more sensors are provided to detect when the valve plate is in the first position or the second position, the outputs of those sensors may be connected to a hydraulic control unit in order to relay information about the shut-off valve 1 position to the processor. The processor may be configured to control the operation of the hydraulic system (e.g. the operation of the hydraulic pump) based on the sensed position of the shut off valve 1. In particular, the processor may determine that the hydraulic pump is not to be operable, or issues an alert to a user, when the first sensor does not detect that the valve plate is in the first position.

INDUSTRIAL APPLICABILITY

The shut off valve of this disclosure may be configured to control the flow of hydraulic fluid from a hydraulic reservoir to other components of a hydraulic system. The shut off valve of this disclosure may be installed in a hydraulic system in a variety of configurations.

One application for the shut off valve may be to prevent the flow of hydraulic fluid from a hydraulic fluid reservoir in order to allow other components of the hydraulic system to be serviced, or replaced, without having to drain the hydraulic fluid from the hydraulic fluid reservoir. The shut off valve may be installed on any suitable hydraulic system, for example a hydraulic machine. The hydraulic machine may be, for example, an off-road vehicle, a backhoe, a dump truck, a crane, a wheel loader, an excavator, a mining shovel, an extruder, or a hydraulic press.

The invention claimed is:

1. A shut off valve for a hydraulic system comprising:
a wall of a hydraulic reservoir for holding hydraulic fluid;
a hydraulic fluid outlet formed through the wall;
a valve seat provided on an inner surface of the wall encircling the hydraulic fluid outlet, the valve seat having an engagement surface;
a valve plate shaped to engage with the engagement surface;
a valve control shaft formed through the wall spaced apart from the hydraulic fluid outlet;
a valve arm connected between the valve plate and the valve control shaft,
wherein the valve plate is configured to rotate about the valve control shaft between:
a first position in which the valve plate does not cover the valve seat; and
a second position in which the valve plate covers the valve seat to shut off the hydraulic fluid outlet;
wherein the valve control shaft includes an aperture extending through a diameter of the valve control shaft, and a locking pin assembly comprising a locking pin insertable through the aperture into one of a first position locking pin receiver or a second position locking pin receiver to lock the valve control shaft in either the first position or the second position; and
wherein the engagement surface of the valve seat is inclined, relative to a plane of rotation of the valve plate, between the first and second positions such that the valve plate is sealed against the engagement surface when the valve plate is in the second position.

2. The shut off valve according to claim 1, wherein the engagement surface of the valve seat is inclined relative to a plane of rotation of the valve plate by at least 1° and no greater than 10°.

3. The shut off valve according to claim 1, wherein the valve plate is connected to the valve arm at a centre of the valve plate, wherein the valve plate is rotatable with respect to the valve arm about the centre of the valve plate.

4. The shut off valve according claim 1, wherein the valve arm is provided on an opposing side of the valve plate to the valve seat.

5. The shut off valve according to claim 1, wherein the valve plate is a circular plate.

6. The shut off valve according to claim 1, wherein a centre of the engagement surface of the valve seat is offset from the plane of rotation of the valve plate in a direction normal to the plane of rotation of the valve plate such that the valve arm bends when moving from the first position to the second position.

7. The shut off valve according to claim 6, wherein a ramp guide provided on the wall adjacent to the valve seat, the ramp guide comprising a ramp surface inclined between the first and second positions of the valve plate,
wherein the ramp guide is configured to guide the valve plate as it rotates from the first position to the second position.

8. The shut off valve according to claim 6, wherein the bending of the valve arm provides a spring force of at least 50 N to seal the valve plate against the engagement surface of the valve seat in the second position.

9. The shut off valve according to claim 1, further comprising:
a first sensor configured to detect when the valve plate is in the first position; and/or
a second sensor configured to detect when the valve plate is in the second position.

10. The shut off valve according to claim 1, further comprising:
a first castellation configured to abut the valve arm in the first position and a second castellation configured to abut the valve arm in the second position, the first and second castellations defining the range of rotation of the valve plate between the first and second positions.

11. The shut off valve according to claim 1, further comprising:
a locking pin assembly comprising a locking pin, a first position locking pin receiver, and a second position locking pin receiver,
the locking pin assembly configured to lock the valve control shaft in the first position or the second position.

12. The shut off valve according to claim 1, wherein the wall of the hydraulic reservoir comprises a plate configured to be installed in an aperture of a hydraulic reservoir.

13. A hydraulic system comprising:
a hydraulic reservoir configured to hold hydraulic fluid, the hydraulic reservoir comprising at least one wall;
a hydraulic fluid outlet formed through the wall;
a hydraulic pump fluidly connected to the hydraulic fluid outlet; and
a shut off valve comprising:
a valve seat provided on an inner surface of the wall encircling the hydraulic fluid outlet, the valve seat having an engagement surface;
a valve plate shaped configured to engage with the engagement surface of the valve seat;
a valve control shaft formed through the wall spaced apart from the hydraulic fluid outlet;
a valve arm connected between the valve plate and the valve control shaft,
wherein the valve plate is configured to rotate about the valve control shaft between:
a first position in which the valve plate does not cover the valve seat; and
a second position in which the valve plate covers the valve seat to shut off the hydraulic fluid outlet;
wherein the valve control shaft includes an aperture extending through a diameter of the valve control shaft, and a locking pin assembly comprising a locking pin insertable through the aperture into one of a first position locking pin receiver or a second position locking pin receiver to lock the valve control shaft in either the first position or the second position;
wherein the engagement surface of the valve seat is inclined, relative to a plane of rotation of the valve plate, between the first and second positions such that the valve plate is sealed against the engagement surface when the valve plate is in the second position.

14. The hydraulic system according to claim 13, further comprising:
a first sensor configured to detect when the valve plate is in the first position, wherein the hydraulic pump is not operable, or issues an alert, when the first sensor does not detect that the valve plate is in the first position.

15. The hydraulic machine comprising the hydraulic system of claim 13.

* * * * *